Patented Aug. 24, 1954

2,687,358

UNITED STATES PATENT OFFICE 2,687,358

STABILIZED SOIL AND A PROCESS OF STABILIZING IT

Edward C. Allberry and Stanley W. Hawkins, Northwich, England, assignors to Imperial Chemical Industries Limited, a corporation of Great Britain No Drawing. Application December 12, 1950, Serial No. 200,484

Claims priority, application Great Britain December 23, 1949

13 Claims. (Cl. 106—287)

This invention relates to a method for the stabilisation of compacted soil of the type which is applicable inter alia to the manufacture of soil roads and to said stabilized soil.

Bitumen is too expensive to use as binder in regions where traffic is infrequent and roads are long. Consequently, many countries have roads consisting simply of earth in which there is enough clay to produce cohesion. The moisture contained in the soil must also be within certain limits, which vary somewhat with the character of the soil, for the soil to be cohesive. In moist climates, one serious difficulty is to prevent the soil absorbing considerably more than the optimum amount of water and becoming too muddy for use. The presence of gravel in the soil imparts hardness and supporting power; fine sand helps to embed it, and silt acts as a filler; while moist clay provides the cohesive bond for the whole. These types of road are known as water-bound soil roads.

It is known that when calcium chloride is incorporated in the upper surface of an earth road it retards the evaporation of soil moisture during periods of low humidity, and causes absorption of water vapour from the air during periods of high humidity. Absence of moisture from soil road surfaces can cause dust formation. Furthermore, the presence of CaCl$_2$, by aiding the maintenance of a favourable moisture content will keep the mat sufficiently tight so that when rain comes it cannot penetrate the surface to cause softening. However, periodic applications of calcium chloride are an essential feature of the maintenance of this type of surface, because the calcium chloride is eventually washed out of the surface of the soil by the rain. Furthermore, the calcium chloride treatment is more suited to a dry climate than a wet one since, unless the soil is carefully graded, the treatment is insufficient to maintain the strength of the soil under deluge conditions, and the road readily becomes rutted.

One method of classifying a soil is by its plasticity index, which is defined as the difference between its liquid limit and its plastic limit. The liquid limit is the moisture content (expressed as percentage of the weight of oven-dried soil) at which the soil will just begin to flow when jarred ten times. The plastic limit is similarly the moisture content at which the soil can be rolled into 3 mm. diameter threads without the threads breaking into pieces (see American Society for Testing Materials methods numbers D 423–39 and D 424–39 respectively). The significance of the plastic limit is that it defines the moisture content at which a relatively sharp change occurs in the mechanical properties of the soil. At moisture contents below the plastic limit the soil can be regarded as a solid capable of resisting shear, whereas at higher moisture contents the soil becomes plastic and will flow under load. Heavy clays have a plasticity index exceeding 20, silty clays 10–20, sand-clay mixtures 0–10, sand and non-cohesive soils 0.

We have found that certain polymethine colouring matters especially hydroxyglutaconic aldehyde dianil hydrochloride, have a high waterproofing action on soils, thus permitting soil which contains the optimum amount of water to remain in this condition for many months. In particular, in periods of high rainfall, soil roads treated with these polymethine compounds retain their stability, cohesion, and load-bearing strength.

We have also found that these polymethine colouring matters can be used in addition to calcium chloride, so that we can take advantage of the valuable properties of both stabilisers at once. Thus, during wet weather the polymethine compound protects the road surface from absorbing too much water and becoming rutted, and during dry weather the calcium chloride comes into action and prevents loss of moisture and the formation of dust. Furthermore, the protective action of the polymethine compounds prevents the removal of the CaCl$_2$ by rain and reduces the maintenance required.

According to the present invention, therefore, we stabilise compacted soil by incorporating therein before compaction one or more polymethine colouring matters having the general formula

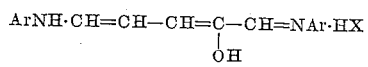

where X is the anion of a strong acid and Ar is an aromatic residue free from sulphonic groups. The invention also comprises the mixture of soil with between 0.05 and 1% by weight of the said polymethine colouring matter, and if desired between 0.1 and 1% of solid calcium chloride.

Suitable strong acids have a dissociation constant exceeding $10^{-4}$. The preferred acids are hydrochloric, phosphoric and sulphuric acids; examples of others which can be used are hydrobromic and para-toluene-sulphonic acids. The most effective aromatic residues are phenyl, ortho-tolyl and para-tolyl; examples of other suitable residues are meta-tolyl, alpha-naphthyl, beta-naphthyl, ortho- and parachlorophenyl, para-hydroxyphenyl, para-bromophenyl, and meta-acetophenyl groups. These polymethine colouring matters are salts of hydroxyglutaconic aldehyde substituted dianils with mineral and other strong acids, and can be made by condensing furfural with aromatic amines in presence of strong acids. The preferred amines are aniline, ortho- and paratoluidine, but other amines such as beta-naphthylamine can also be used.

These polymethine compounds may be made by condensing 2 moles of a primary aromatic amine with 1 mole of furfural in presence of a strong acid in alcohol as a solvent, as described by J. Stenhouse, "Annalien," vol. 156 (1870), p. 200. The reaction is complete in 60 minutes, and the product is isolated by filtration. The product appears either as a floury violet-red powder, or as very fine blue crystals having a metallic sheen. It is slightly soluble in alcohol (about 2 grams per litre), not appreciably soluble in water but giving a mildly acidic solution, and insoluble in most organic solvents. On heating, it chars without melting.

One substantial practical advantage in the use of our polymethine waterproofing agents is that they are dry powders which can easily be incorporated sufficiently homogeneously into the soil by mechanical methods. One method is to pick up the top 10–15 centimetres depth of soil, mix the waterproofing agent with it in a mixer, spread the stabilised soil in place, and then compact it. A similar method is to apply the waterproofing agent mechanically to the soil by means of a machine which turns up and mixes the soil, and at the same time adds the waterproofing agent, deposits the so-treated soil again, and consolidates it. However, it is often sufficient just to spread the waterproofing agent on the soil, and rake or harrow it in before compacting the top layer of soil.

The amount of waterproofing agent depends principally on the nature of the soil. It is not possible to state with certainty the optimum amount for any one class of soil, partly because of the difficulty of classifying soils. However, the amount required for each soil can readily be found by mixing a small amount of waterproofing agent with a sample of the soil and measuring the resistance of the mixture to change in moisture content by a capillary water absorption test. This test may be carried out by compacting the mixture under standard conditions (such as are described in Example 1) into a suitable shape, and standing it so that the base is immersed in water for 1–4 weeks. The water absorption is then measured, and sufficient waterproofing agent has been added if the moisture content of the sample has not risen above the plastic limit.

In the case of a certain sandy clay soil having a plastic limit of 14% the optimum moisture content for compaction was 10%. The addition of 0.1% of our polymethine stabiliser to soil compacted at 10% moisture content prevented the absorption of water beyond the plastic limit, and the block of soil retained its cohesion when dipped into water. Without the stabiliser a similar block of soil absorbed a further 12% of moisture, raising its moisture content to 22%, which was above the plastic limit, and the block disintegrated.

In the case of a black cotton soil from Nigeria having a plastic limit of 28%, the optimum moisture content for compaction was 16%. When a block of this soil compacted at 16% moisture content was placed in water it promptly absorbed a further 20% of water and disintegrated. When treated with 1% of our polymethine stabiliser, this absorption was reduced and the moisture did not rise above 28%, with the result that block retained its cohesion.

In general, the approximate amounts of waterproofing agent required, in per cent by weight of the oven-dried soil, are as follows:

| | Per cent |
|---|---|
| Heavy clay soil (e.g. black cotton soil from Nigeria) | 0.3–1 |
| Silty clay soil (e. g. red silt from S. Rhodesia) | 0.1–0.7 |
| Sandy clay soil (e. g. sandy clay from Cheshire, England) | 0.05–0.3 |

The invention finds its principal utility in soil roads, but it has several valuable uses with soil. It is customary in many tropical countries, e. g. East Africa, to make sun-dried bricks by moulding wet soil and, when partially set, leaving it to dry in the sun until it reaches its maximum hardness. Such bricks, in order to have the requisite strength must not be exposed to too much rain, because they become muddy and lose their strength. We have shown that by the application of the polymethine colouring matters in accordance with this invention such sun-dried soil bricks may be stabilised so that they do not deteriorate during wet weather. It is also customary in tropical countries, especially in India, to make soil roofs from water-bound soil which is compacted into position and left to dry in the sun. By incorporating a small proportion of polymethine colouring matters of this invention in such soil roofs the life of the roof is considerably extended.

A further important use for this invention is in connection with the making of roads in clayey districts. Many roads are made by laying a bitumen or asphalt layer on soil in districts where stone or other concrete is not available to provide the basis for this bitumen layer. Such roads, in districts where the subsoil is clay, crack when placed under load in wet weather because the wet clay softens and swells and thus distorts the bitumen layer. On the other hand, in fine weather conditions the clay contracts and the bitumen layer is not adequately supported. The stabilisation of such clay sublayers by the polymethine compounds of our invention minimises changes in water content of the clay and thus enhances the durability of such roads very considerably.

The stabilisation of soil by this invention is illustrated by the following examples in which we have measured the capillary water absorption of cylinders of soil. All parts are by weight.

*Example 1*

The soil used was an artificial one made from 30 parts of china clay with 170 parts of ground purified quartz and mixed with 20 parts of water to aid compaction. This soil was mixed with 1 part of the polymethine colouring matter obtained by condensing furfuraldehyde with α-naphthylamine and hydrochloric acid. The treated soil was then compacted in a cylindrical mould 1″ long by 1″ diameter until the compacted cylinder contained 10% by volume of air. The cylinder was removed from the mould and coated with paraffin wax, and stored for 3 days. The wax was then stripped off one end and slits were made in the other end to permit egress of air. The cylinder was weighed and stood open end down in water to a depth of 1/10". After 7 days the weight of water absorbed was found to be only 0.5 gm. For comparison, without any of the polymethine colouring matter present, the same soil absorbed 2.5 gm. of water in 7 days in this test; the plastic limit of this soil being 19%.

*Example 2*

The soil used was made from 30 parts of alumina powder and 170 parts of ground quartz. It was tested as in Example 1, and in the absence of any additive the water absorption in 7 days was found to be 2.1 gm., the plastic limit of this soil being 16%. With the addition of 1 part of the substance obtained by condensing furfuraldehyde with p-toluidine and hydrochloric acid, the water absorption in 7 days was only 0.6 gm.

*Example 3*

The same soil was used as in Example 1, and two identical samples were used. The first was mixed with 0.05% of hydroxyglutaconic aldehyde dianil hydrochloride

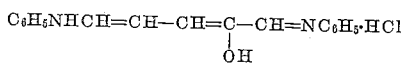

and the second with 0.5% of the same material. On compacting these samples and submitting them to the test described in Example 1, the first sample absorbed only 0.5 gm. of water and the second absorbed only 0.3 gm.

*Example 4*

The same soil was used as in Example 1. It was mixed with 0.1% of hydroxyglutaconic aldehyde dianil hydrochloride,

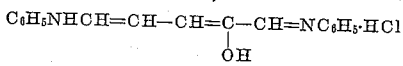

and 0.5% of powdered calcium chloride, and tested as in Example 1. It only absorbed 0.4 gm. of water. A further sample of the same mixture, when dried, readily absorbed water vapour from the atmosphere.

*Example 5*

The soil used was a lateritic type of soil being a red silt from Chipinga, Southern Rhodesia. It was tested as in Example 1, and in the absence of any additive the water absorption in 7 days was found to be 2.7 gm., the plastic limit being 19%. With the addition of 0.05% by weight of the substance obtained by condensing furfuraldehyde with p-chloraniline and hydrochloric acid, the water absorption in 7 days was only 0.8 gm.

The above examples demonstrate the invention as a waterproofing and thus stabilizing method for soils. It can also be demonstrated on roadways and in brickmaking, as shown in the following examples.

*Example 6*

A sandy-clay soil from Holford, Cheshire, was used as the constructional material for a road surface. This soil had a plastic limit of 17% and a plasticity index of 4. The soil was removed from its natural site in a dry condition (4–5% moisture content) and mechanically broken to a fine tilth. It was then mixed with 0.25% by weight of hydroxyglutaconic aldehyde dianil hydrochloride, moistened with water to reach a moisture content of 10% and placed in position on the subgrade which was simply the natural sandy soil of the neighbourhood which had been lightly compacted. Sufficient treated soil was laid down to make a carpet 9" deep after compaction with hand beaters and rolling. A further stretch of roadway was constructed using only 0.1% of hydroxyglutaconic aldehyde dianil hydrochloride, and another stretch to act as a control contained no stabilizing agent at all.

After 4 months' exposure to weather and traffic, during which time over 13 inches of rain had fallen, both examples of treated soil road remained hard and compact while the control length containing no stabilizer had softened to a mud which formed ruts under the traffic, becoming a slippery quagmire.

*Example 7*

A sample of clay from Holford, Cheshire, having a plastic limit of 15% and a plasticity index of 10 was dried in an air oven and pulverised. It was then mixed in the dry state with 0.25% of hydroxyglutaconic aldehyde dianil hydrochloride and 11% of water and compacted into moulds 9" x 9" x 18". The resulting bricks were removed from the moulds and dried in an air oven at 50° C. The high resistance of these bricks to wet climates was then demonstrated as follows. On exposure to a stream of water from a hosepipe at a rate of 12 litres per minute, the bricks remained hard and dry. Similar bricks made in the same way but omitting the stabilizer disintegrated rapidly under the action of the stream of water and had washed away to less than half their former dimensions in 2 hours' hosing.

What we claim is:

1. Soil containing between 0.05 and 1.0% by weight of at least one polymethine colouring material having the general formula $$ArNH \cdot CH=CH-CH=\underset{\underset{OH}{|}}{C}-CH=NAr \cdot HX$$

in which X is the anion of a strong acid and Ar is an aromatic group free from sulphonic substituents.

2. Soil as recited in claim 1 in which between 0.3 and 1.0% of the said polymethine compound is incorporated in a heavy clay soil.

3. Soil as recited in claim 1 in which between 0.1 and 0.7% of the said polymethine compound is incorporated in a silty clay soil.

4. Soil as recited in claim 1 in which between 0.05 and 0.3% of the said polymethine compound is incorporated in a sandy clay soil.

5. Soil as recited in claim 1 in which said soil contains between 0.1 and 1.0% by weight of solid calcium chloride in addition to said polymethine colouring materials.

6. Soil containing between 0.05 and 1.0% by weight of

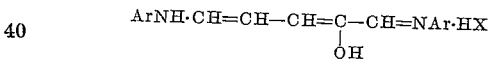

7. Soil as recited in claim 6 in which said soil additionally contains between 0.1 and 1.0% by weight of solid calcium chloride.

8. A water-bonded compacted soil containing at least one polymethine colouring material having the general formula $$ArNH \cdot CH=CH-CH=\underset{\underset{OH}{|}}{C}-CH=NAr \cdot HX$$

in which X is the anion of a strong acid and Ar is an aromatic group free from sulphonic substituents.

9. A process for the stabilization of water-bonded compacted soil which comprises incorporating therein before compaction at least one polymethine colouring material having the general formula $$ArNH \cdot CH=CH-CH=\underset{OH}{C}-CH=NAr \cdot HX$$

in which X is the anion of a strong acid and Ar is an aromatic group free from sulphonic substituents.

10. A process as recited in claim 9 in which between 0.1 and 0.5% by weight of solid calcium chloride is also incorporated into the soil.

11. A process for the stabilization of water-bonded compacted soil which comprises incorporating therein before compaction $$C_6H_5NHCH=CH-CH=\underset{OH}{C}-CH=NC_6H_5 \cdot HCl$$

12. A process as recited in claim 11 in which between 0.1 and 0.5% by weight of solid calcium chloride is also incorporated into the soil.

13. Soil containing between 0.05 and 1.0% by weight of at least one polymethine coloring material having the general formula $$ArNH \cdot CH=CH-CH=\underset{OH}{C}-CH=NAr \cdot HX$$

in which X is the anion of a strong acid and Ar is selected from the group consisting of aryl groups, haloaryl groups, lower alkacyl aryl groups and hydroxyaryl groups.

References Cited in the file of this patent

UNITED STATES PATENTS

| Number | Name | Date |
|---|---|---|
| 1,878,557 | Wahl | Sept. 20, 1932 |
| 2,201,459 | Hulst | May 21, 1940 |

FOREIGN PATENTS

| Number | Country | Date |
|---|---|---|
| 433,957 | Great Britain | Aug. 23, 1935 |